United States Patent [19]

Siedenstrang et al.

[11] 4,168,341

[45] Sep. 18, 1979

[54] FABRIC-BACKED TELEBLOCK COPOLYMER COMPOSITION WITH DULLED SURFACE USEFUL IN FOOTWEAR UPPERS

[75] Inventors: Roy W. Siedenstrang, Stow, Ohio; Richard E. Elliott, Bartlesville, Okla.

[73] Assignee: Phillips Petroleum Co., Bartlesville, Okla.

[21] Appl. No.: 879,568

[22] Filed: Feb. 21, 1978

[51] Int. Cl.$^2$ ............................................. C08L 9/00
[52] U.S. Cl. .................................. 428/411; 428/423; 428/424; 428/474; 428/480; 428/500; 525/314; 525/901
[58] Field of Search ...... 260/2.5 HB, 2.5 H, 17.4 CL, 260/880 B, 873, 857 G, 857 UN, 879, 887, 892; 428/411, 423, 424, 474, 480, 500

[56] References Cited

U.S. PATENT DOCUMENTS

| | | | |
|---|---|---|---|
| 2,638,457 | 5/1953 | Gates | 260/17.4 R |
| 3,030,346 | 4/1962 | Cooper | 260/880 |
| 3,268,636 | 8/1966 | Angell | 264/51 |
| 3,281,383 | 10/1966 | Zelinski et al. | 260/23.7 |
| 3,294,868 | 12/1966 | Pritchard | 260/2.5 HB |
| 3,441,530 | 4/1969 | Bauer et al. | 260/880 B |
| 3,464,850 | 9/1969 | Haefele | 260/880 |
| 3,534,130 | 10/1970 | Yamamoto et al. | 264/54 |
| 3,600,462 | 8/1971 | Harmon | 260/880 B |
| 3,629,372 | 12/1971 | Drake | 260/880 B |
| 3,639,521 | 2/1972 | Hsieh | 260/880 |
| 3,776,989 | 12/1973 | Annis et al. | 264/51 |
| 3,859,250 | 1/1975 | Fodor | 260/880 B |
| 3,878,143 | 4/1975 | Baumann et al. | 260/17.4 CL |
| 4,048,254 | 9/1977 | Hillier et al. | 260/873 |

Primary Examiner—Maurice J. Welsh

[57] ABSTRACT

A laminate in which a fabric backing is adhered to a composition containing a radial teleblock copolymer having blocks of poly(conjugated diene) and poly(monovinylaromatic) and sufficient surface dulling agent to provide a suede-like surface. A laminate as described having high air permeability and suede-like surface is used as material for uppers of shoes.

9 Claims, No Drawings

FABRIC-BACKED TELEBLOCK COPOLYMER COMPOSITION WITH DULLED SURFACE USEFUL IN FOOTWEAR UPPERS

BACKGROUND OF THE INVENTION

This invention relates to footwear. In one of its aspects this invention relates to material useful in preparing uppers for footwear. In another of its aspects this invention relates to laminated material. In yet another of its aspects this invention relates to laminates of radial teleblock copolymer and fabric backing. In still another aspect of the invention it relates to polymeric compositions with surfaces dulled to a suede-like finish.

Poly (vinylchloride) compositions and other polymer-base compositions are well-known in the art for use in footwear uppers. Such compositions generally exhibit glossy surfaces and low air permeability or breathability. The present invention provides a laminate composed of a polymeric composition having a dulled, suede-like surface adhered to a fabric backing that is suitable, because of its suede-like surface, not only for such leather-substitute uses as outerwear and handbags; but, because of the high air permeability or breathability, is also useful, when bonded to an appropriate soling material, for use as uppers for shoes or boots.

It is therefore an object of this invention to provide a composition suitable for coating a fabric backing to provide a suede-like surface for the backing. It is another object of the invention to provide a laminate that is useful as a leather-substitute. It is still another object of the invention to provide a fabric-backed polymeric laminate suitable because of its high air permeability for use in footwear uppers.

Other aspects, objects, and the various advantages of this invention will become apparent upon reading this specification and the appended claims.

STATEMENT OF THE INVENTION

In accordance with this invention, a composition is provided suitable for coating a fabric backing to provide a suede-like surface. In the composition a radial copolymer is combined with a surface dulling agent.

In an embodiment of the invention a laminate is provided by adhering the surface dulled, radial teleblock copolymer composition described above to a fabric backing. In further embodiments of the invention leather-substitute fabric and uppers for shoes prepared from a laminate as described above are provided.

The radial teleblock copolymers useful in preparing the inventive upper materials are of the formula $(AB)_nY$ wherein A represents a block of poly(monovinylaromatic), B represents a block of poly(conjugated diene), Y represents a residue of a polyfunctional coupling agent or polyfunctional initiator and n is an integer having a value of 3 or more. A and B generally represent pure homopolymer blocks, but it is also within the scope of this invention to include those block copolymers containing the well known "tapered" blocks.

Monovinyl-substituted aromatic monomers useful in the preparation of the A blocks of the above-described copolymers generally contain from 8 to 12 carbon atoms per molecule. Examples of such monomers include styrene, 3-methylstyrene, 4-n-propylstyrene, 1-vinylnaphthalene, 2-vinylnaphthalene and the like. Styrene is preferred.

Useful conjugated dienes for the preparation of the B blocks of the above-described copolymers include those generally containing from 4 to 8 carbon atoms per molecule. Examples of such monomers include 1,3-butadiene, isoprene, 1,3-pentadiene, 2,4-hexadiene, 3-ethyl-1,3-pentadiene, and the like. 1,3-Butadiene and isoprene are preferred.

The radial teleblock copolymers useful in this invention are prepared using polyfunctional organolithium initiators or polyfunctional coupling agents by well known methods described in U.S. Pat. Nos. 3,030,346, 3,251,905, 3,281,383, and 3,639,521.

When Y is a residue of a polyfunctional coupling agent, it is derived from treating agents containing 3 or more, preferably 3 or 4, functional groups per molecule. Useful coupling agents include multiepoxides, multiimines, multiisocyanates, multialdehydes, multiketones, multiesters, multianhydrides and multihalides. Specific examples of such agents include naphthalene-1,2,5,7-tetraisocyanate, tri(1-aziridinyl) phosphine oxide, epoxidized soybean oil, epoxidized linseed oil, 1,4,7-naphthalene tricarboxaldehyde, 1,4,9,10-anthracenetetrone, pyromellitic dianhydride, trimethyl tricarballylate, and silicon tetrachloride.

When Y is a residue of a polyfunctional initiator it is derived from compounds of general formula $R(Li)_{(Li)x}$ wherein x is an integer of 3 or more, preferably 3 or 4, and R is an aliphatic, cycloaliphatic or aromatic radical containing from 1 to 20 carbon atoms.

Specific examples of useful polyfunctional initiators include 1,3,5-trilithiopentane, 1,2,5trilithionaphthalene, 1,3,5,8-tetralithiodecane, and 1,2,3,5-tetralithiocyclohexane.

The A/B weight ratio in the above-described polymers will generally be in the range of 50/50 to 5/95 and preferably in the range of 40/60 to 15/85. The block copolymers will generally be in the range of weight average molecular weight from 10,000 to 750,000 and preferably from 50,000 to 350,000.

In accordance with this invention, surface-dulling agents or gloss-reducing agents are employed in the radial teleblock copolymer-based compositions. Finely divided cellulosic materials, finely divided textile fibers, finely divided hydrocarbon polymers, or blowing agents can be employed as surface-dulling additives. These additives can be incorporated into the polymeric compositions as described in Ser. No. 621,100 filed Oct. 9, 1975 now U.S. Pat. No. 4,126,662; U.S. Pat. Nos. 2,638,457; 3,268,636; and 3,776,989 which disclose methods suitable for incorporating various additives. These cited writings are incorporated herein by reference.

Suitable finely divided cellulosic materials include well known materials such as cotton floc, linen fibers or wood flour.

Finely divided textile fibers useful in this invention include, in addition to the above-mentioned cotton floc and linen fibers, synthetic fibers, such as nylon, poly(ethylene terephthalate), polyacrylonitrile, rayon, and the like. Textile fibers of length of up to about 3 mm can be used.

Suitable hydrocarbon polymers that can be employed as surface-dulling agents are those that possess a maximum melting point of about 200° C. Examples include high density polyethylene, low density polyethylene, crystalline polypropylene and ethylene-propylene copolymers, among others. Suitable size for the finely divided polymers is in the range of about 5 microns to about 5 mm.

The amount of finely divided materials including the cellulosic materials, textile fibers or hydrocarbon polymers employed will generally be any amount which provides the desired degree of surface-dulling. However, for practical application the amount of such material added will usually fall within the range of about 2 to about 75 parts by weight per 100 parts by weight rubber (phr).

Blowing agents, as the term is herein employed, are compounds which thermally decompose in the temperature range of about 120° to 230° C., preferably 175° to 200° C. without causing loss of the desirable properties of the radial teleblock copolymer with which they are being employed. These blowing agents can be employed in quantities ranging from 0.05 to 1.0, preferably 0.05 to 0.5 phr. Examples of such compounds include 2,2'-azobis(2-methylpropionitrile), N,N'-dinitrosopentamethyltetraamime, p,p'-oxybis(benzenesulfonyl hydrazide), urea, azodicarbonamide and the like. If the blowing agent is incorporated into the copolymer by a mixing operation involving an internal mixer or a 2-roll mill, the blowing agent selected must be one possessing a decomposition temperature above that of the mixing operation. The blowing agent should also decompose at or below application temperature of the rubber composition to the fabric. It is essential that the blowing agent decompose during the application process or in a subsequent heat treatment in order to provide the desired surface roughness required for a reduction in gloss.

It is within the scope of this invention to include in the radial teleblock copolymer-based composition any other additives which are well known in the rubber art to provide desired properties. Such additives include the well known plasticizers, extender oils, pigments, reinforcing agents, stabilizers, processing aids, and, if desired, curing agents.

As the plasticizer component of the inventive footwear upper materials any of the nonvolatile plasticizers which are well known in the rubber art and which are compatible with the other components of the composition can be employed. Exemplary plasticizers include dialkyl phthalates, rosin esters, mineral oils, as well as the well known aromatic, naphthenic, or paraffinic extender oils.

The footwear upper materials of this invention can be pigmented to any desired color using any appropriate pigmenting material. Titanium dioxide and carbon black are well known pigments, though many other pigments are commercially available which cover the entire spectrum of desired colors.

Fillers or reinforcing agents can be employed as desired in the inventive compositions. Many materials which are well known in the rubber art can be employed in these compositions. Such additives include the well known carbon black clays, talc, alkaline earth carbonates, silica, metallic oxides, and the like.

It is usually desirable to include stabilizers in the inventive formulations. Such stabilizers include the well known antioxidants and antiozonants, as well as ultraviolet and thermal stabilizers. Hindered phenols, substituted phosphites, phenolic phosphites, dialkyl thiodipropionates, nickel dialkyldithiocarbamates, and the like and mixtures thereof are examples of types of stabilizers which are particularly beneficial in the present invention.

If it is desired to include a release agent or processing aid in the footwear upper composition, any of the well known waxes, silicones, metal stearates, and the like can be employed to produce the desired result.

Though the radial teleblock copolymer-based compositions of this invention are moldable and remoldable, thus not requiring vulcanization, it can be desirable in some circumstances to include curing agents in the formulation. If such is the case, the well known sulfur or peroxide curing agents with the associated accelerators and other additives, can be employed in the inventive formulations.

The present invention contemplates a wide variety of materials as the fibrous backing material upon which the radial teleblock copolymer-based composition is applied to give the resultant footwear upper material. The fibrous organic material can be in the form of woven or non-woven fabrics. Exemplary materials include those cellulosic materials such as cotton or rayon, synthetic textile materials such as polyamides, polyesters, polyolefins, and the like as well as mixtures thereof.

The inventive radial teleblock copolymer-based compositions can be prepared by any means well known in the art such as blending the ingredients in an internal mixer and applying sufficient mixing intensity to melt and subsequently homogenize the ingredients. Care should be exercised in the initial mixing operation to insure that any blowing agent present in the formulation is not decomposed at the mixing temperature.

The copolymer-based composition is applied to the backing material employing any of the means which are well known in the art. It is generally desirable to heat the composition to a temperature above the softening point and to apply it as a layer to the fibrous backing material. The temperature of the application process can be sufficiently high to decompose the blowing agent or it can be below the blowing agent decomposition temperature in which case a subsequent heat treating step in which the temperature is raised to the point at or above the decomposition temperature of the blowing agent is applied for a period of time sufficient to provide the desired degree of surface-dulling.

It is also within the scope of this invention to bond the copolymer-based composition to the backing material by means of a suitable adhesive or cement, such as a polyurethane-based cement, an ethylene/vinyl acetate copolymer-based cement or a styrene/butadiene copolymer-based cement. Heat-treatment of a blowing agent-containing composition can be applied before or after bonding to the fabric backing.

The copolymer-based composition is generally applied to the organic backing material in a coating generally from 0.1 mm to 5 mm thick, though it is generally preferred to apply a coating from 0.5 to 3 mm thick.

The various components of the copolymer-based composition are generally employed, when used, in the broad and preferred ranges given in parts by weight in the following summary table:

| Ingredient | Broad | Preferred |
| --- | --- | --- |
| Copolymer | 100 | 100 |
| Plasticizer | 20–150 | 50–100 |
| Blowing Agent | $a$–10 | 2–6 |
| Dulling Agent | $a$–80 | 20–70 |
| Filler | $a$–150 | $a$–50 |
| Pigment | $a$–10 | 1–7 |
| Stabilizer | $a$–5 | 0.5–2 |
| Processing Aid | $a$–5 | 0.5–2 |

| -continued | | |
|---|---|---|
| Ingredient | Broad | Preferred |
| Curatives | $a$-5 | $a$-2 |

$a$Finite amount, providing that either a blowing agent or dulling agent is present

EXAMPLE

The following illustrates the preparation of a film of a composition suitable for use in footwear upper material based upon a butadiene/styrene radial teleblock copolymer.

The ingredients of the copolymer-based composition were combined in proportions given in the following recipe.

RECIPE

| Ingredient | Parts by Weight |
|---|---|
| Copolymer/Extender Oil$^a$ | 150 |
| Oil$^b$ | 25 |
| Wood Flour | 60 |
| Titanium dioxide | 3 |
| Stabilizer$^c$ | 0.5 |
| Dilauryl thiodipropionate | 0.5 |
| Stearic Acid | 1 |
| Azodicarbonamide | 5 |
| Yellow Pigment | 2 |
| Red Pigment | 0.3 |
| Carbon Black | 0.1 |

$^a$60/40 Butadiene/styrene radial teleblock copolymer coupled using silicon tetrachloride - m.w. (weight average) of 273,000, extended with 50 phr naphthenic oil.
$^b$Naphthenic oil.
$^c$Hindered phenol - Irganox 1035 from Ciba-Geigy.

The above ingredients were combined and blended in an internal mixer by heating with mixing to a temperature above the melting point of the polymer.

A portion of the resultant copolymer-based composition was compression molded at 143° C. for two minutes. In Table I are recorded some physical properties of the thus-molded composition.

Table I

| Property | Value |
|---|---|
| 300% modulus, psi | 350 |
| Tensile Strength, psi | 470 |
| Elongation, % | 680 |
| Shore A Hardness | 65 |
| Melt Index | 2 |

In Table II are recorded data on air permeability or breathability of the above composition in films of varying thickness. A control run employing a film of poly(vinylchloride) was provided for a comparison of breathability of the inventive composition with a prior art footwear upper material.

Table II

| Run No. | Thickness, mm | Air Permeability$^a$ |
|---|---|---|
| 1 | 0.64 | 1311 |
| 2 | 0.76 | 1154 |
| 3 | 1.14 | 1227 |
| 4 (PVC) | 0.84 | 224 |

$^a$ASTM D1434-75

The data in Table II show approximately a 5-fold improvement in air permeability for the inventive footwear upper formulation compared to the prior art, poly(vinylchloride) compositions. The inventive film also exhibited a desirable suede-like surface. The thermoplastic nature of the inventive elastomer-based compositions (moldability and green strength without vulcanization) and the above-demonstrated air permeability and suede-like surface are desirable characteristics for materials suitable for use in footwear uppers.

We claim:

1. A laminate comprising a composition adhered to a fabric backing said composition comprising:
   (a) a radial teleblock copolymer of the formula $(AB)_nY$ wherein A represents a block of poly(monovinylaromatic), B represents a block of poly(conjugated diene), Y represents a residue of a polyfunctional coupling agent or polyfunctional initiator, and n is an integer having a value of 3 or more; and
   (b) a surface-dulling agent chosen from the group consisting of finely divided cellulosic materials, finely divided textile fibers, finely divided hydrocarbon polymers, and blowing agents.

2. A laminate of claim 1 wherein monomers suitable in the preparation of the A blocks are chosen from among styrene, 3-methylstyrene, 4-n-propylstyrene, 1-vinylnaphthalene, and 2-vinylnaphthalene, and monomers suitable in the preparation of the B blocks are chosen from the group consisting of 1,3-butadiene, isoprene, 1,3-pentadiene, 2,4-hexadiene, and 3-ethyl-1,3-pentadiene.

3. A laminate of claim 2 wherein the dulling agents are chosen from the group consisting of cotton floc, linen fibers, wood flour, synthetic fibers, high density polyethylene, low density polyethylene, crystalline polypropylene, ethylene-propylene copolymers, 2,2'-azobis(2-methylpropionitrile), N,N'-dinitrosopentamethyltetraamine, p,p'-oxybis(benzenesulfonyl hydrazide), urea, and azodicarbonamide.

4. A laminate of claim 1 also containing compatible additives chosen from the group consisting of plasticizers, extender oils, pigments, reinforcing agents, stabilizers, processing aids, and curing agents.

5. A laminate of claim 1 in which the fabric backing is chosen from the group consisting of woven and non-woven fabrics made from cotton, rayon, polyamides, polyesters, polyolefins, and mixtures thereof.

6. A laminate of claim 1 wherein the polymeric composition is thermally bonded to the fabric. poly(monovinylaromatic), 7. A laminate of claim 1 wherein the polymeric composition is adhered to the fabric with an adhesive.

8. Uppers for shoes prepared from a laminate of claim 1.

9. Leather-substitute fabric prepared from a laminate of claim 1.

* * * * *